(12) United States Patent
Gale et al.

(10) Patent No.: US 8,646,313 B2
(45) Date of Patent: Feb. 11, 2014

(54) SYSTEM AND METHOD TO PROVIDE LUBRICATION FOR A PLUG-IN HYBRID

(75) Inventors: Allan Roy Gale, Livonia, MI (US);
Michael W. Degner, Novi, MI (US);
Paul Theodore Momcilovich, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 12/488,842

(22) Filed: Jun. 22, 2009

(65) Prior Publication Data
US 2010/0321030 A1 Dec. 23, 2010

(51) Int. Cl.
*G01R 31/28* (2006.01)

(52) U.S. Cl.
USPC .............................................. 73/37; 324/537

(58) Field of Classification Search
USPC ...................................................... 73/114.57
See application file for complete search history.

(56) References Cited

U.S. PATENT DOCUMENTS

| | | | |
|---|---|---|---|
| 3,163,042 A | 12/1964 | O'Sullivan | |
| 5,372,213 A | 12/1994 | Hasebe et al. | |
| 5,474,428 A | 12/1995 | Kimura et al. | |
| 5,944,632 A | 8/1999 | Hara et al. | |
| 6,213,061 B1 | 4/2001 | Bartolazzi et al. | |
| 6,390,947 B1 * | 5/2002 | Aoki et al. | 477/3 |
| 6,527,074 B1 | 3/2003 | Morishita | |
| 6,571,157 B1 * | 5/2003 | Dahlin et al. | 701/22 |
| 6,607,142 B1 | 8/2003 | Boggs et al. | |
| 6,778,076 B2 * | 8/2004 | Shidara et al. | 340/451 |
| 6,861,820 B2 | 3/2005 | Gale et al. | |
| 6,913,558 B2 * | 7/2005 | Mori et al. | 477/3 |
| 2002/0091034 A1 * | 7/2002 | Nakamori et al. | 477/3 |
| 2004/0045749 A1 | 3/2004 | Jaura et al. | |
| 2005/0244284 A1 | 11/2005 | Kolb | |
| 2008/0139360 A1 * | 6/2008 | Hayashi et al. | 477/3 |
| 2008/0182696 A1 * | 7/2008 | Sah et al. | 475/117 |
| 2008/0184776 A1 * | 8/2008 | Staley et al. | 73/37 |
| 2009/0082150 A1 * | 3/2009 | Wu et al. | 475/5 |
| 2009/0107755 A1 | 4/2009 | Kothari et al. | |
| 2009/0111637 A1 | 4/2009 | Day et al. | |

FOREIGN PATENT DOCUMENTS

JP 2006-067640 3/2006

OTHER PUBLICATIONS

U.S. Appl. No. 12/488,858, filed Jun. 22, 2009, entitled "System and Method to Provide Lubrication for a Plug-In Hybrid".

* cited by examiner

*Primary Examiner* — Hezron E Williams
*Assistant Examiner* — Mark A Shabman
(74) *Attorney, Agent, or Firm* — David B. Kelley; Brooks Kushman P.C.

(57) ABSTRACT

In hybrid electric vehicles having increased battery storage capacity and plug-in capability, electric-only operation of significant duration is available. To supplement lubrication for the electric and mechanical components provided in a fluid circuit by an engine-driven mechanical pump, an electric pump is provided in parallel to the mechanical pump. When the electric pump is operating, a diagnostic can be performed to determine system integrity. According to one embodiment, an actual quantity provide to the circuit is determined; an expected quantity is estimated; and a fault is determined when the actual and expected quantities differ by more than a predetermined amount. The fault may indicate a leak or plug in the fluid circuit or a failure of a component in the fluid circuit.

15 Claims, 6 Drawing Sheets

SYSTEM AND METHOD TO PROVIDE LUBRICATION FOR A PLUG-IN HYBRID

BACKGROUND

1. Technical Field

The present development relates to supplying oil to lubricate and cool components in a hybrid electric vehicle.

2. Background Art

Typical hybrid electric vehicles (HEVs) in widespread use have a limited battery capacity; in such systems the vehicle operates on electric-only operation for limited periods of time. The components requiring lubrication are supplied by a mechanical pump coupled to the internal combustion engine. Thus, in electric-only operation, the mechanical pump does not rotate and supplies no oil to components in the oil circuit. It has been found that the amount of oil in the components is sufficient for such limited periods of electric-only operation. In such HEVs, the amount of electric-only operation is limited, though, by how long the components can survive on the residual lubricant in the system.

To further reduce petroleum consumption in HEVs, manufacturers are developing plug-in hybrid electric vehicles (PHEVs). The battery pack on a PHEV has a greater storage capacity and the PHEV is provided with charging capability to charge the battery pack from an electrical grid so that the PHEV derives its power from both the electrical grid and petroleum sources. The duration of electric-only operation in a PHEV is significantly increased in comparison to HEVs with limited battery capacity. The lubrication and cooling needs of power-generating and power-transmitting components in the PHEV are not satisfied by the mechanical pump driven by the internal combustion engine.

SUMMARY

According to an embodiment of the present disclosure, an electric pump is fluidly coupled to the oil circuit in parallel with the mechanical pump. When the electric pump is operating, a diagnostic can be performed by determining an actual pressure in the circuit and an expected pressure. The fault is determined when the actual and expected pressures differ by more than a predetermined amount. The fault may indicate a leak or plug in the fluid circuit or a failure of a component in the fluid circuit.

According to an alternative embodiment, the diagnostic is performed by estimating an actual flow rate, estimating an expected flow rate, and detecting the fault when the actual flow rate differs from the expected flow rate by more than a predetermined amount.

An advantage is that the electric pump can be used as a diagnostic to detect faults in the fluid circuit without providing additional sensors to perform such a diagnostic.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
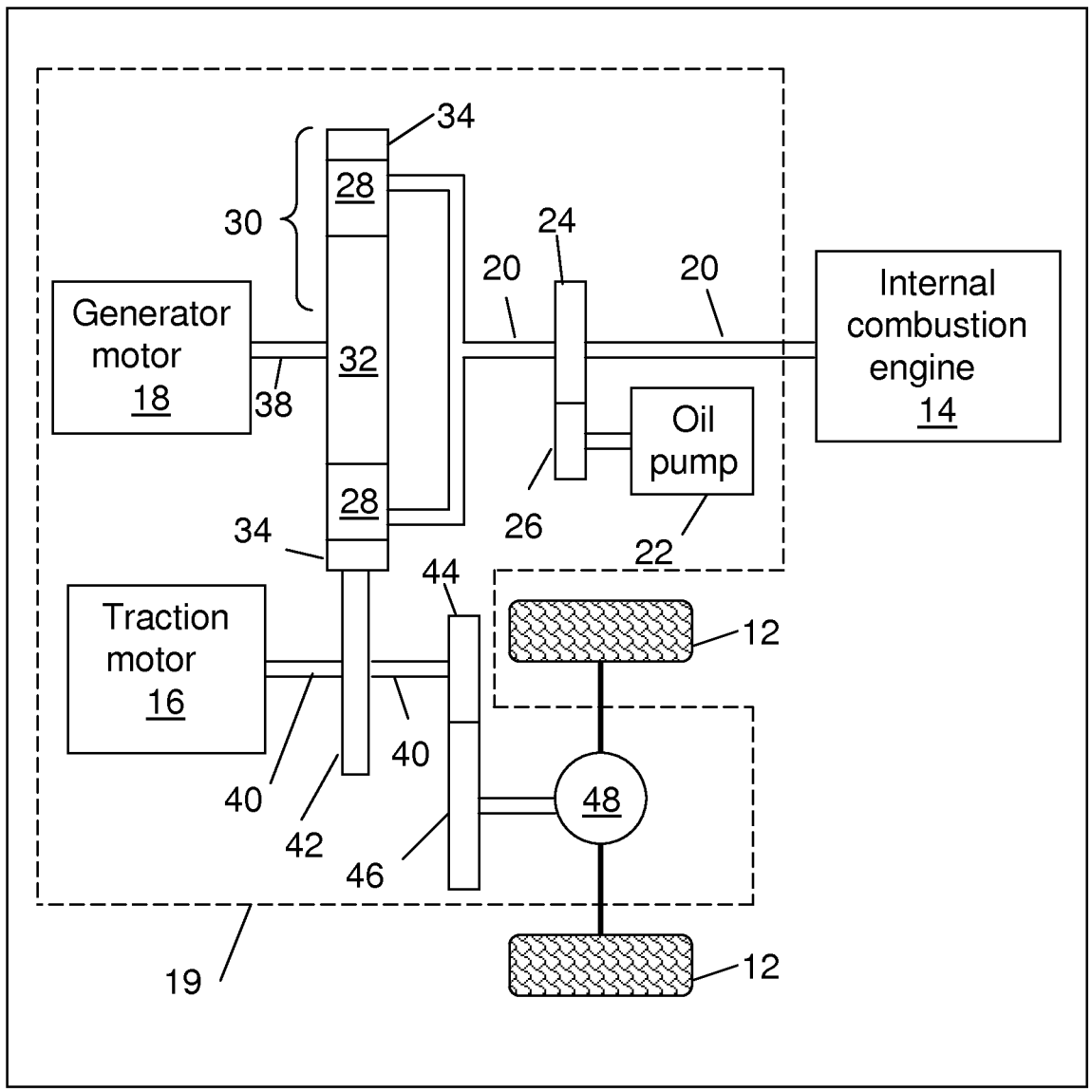
FIG. 1 is a schematic representation of an exemplary configuration of mechanical components in a hybrid electric vehicle.

In FIG. 1, a schematic of one exemplary mechanical arrangement of components in a HEV is shown. The HEV has multiple propulsion sources capable of providing power at the wheels 12, including: an internal combustion engine 14, a fraction motor 16, and a generator motor 18. Internal combustion engine 14 is coupled to a transaxle 19 via a shaft 20. Shaft 20 drives a mechanical oil pump 22 via gear 24 and pump gear 26, gear 24 being coupled to shaft 20. Mechanical oil pump 22 pumps oil through a fluid circuit. The fluid circuit is discussed further in regards to FIG. 2. Mechanical oil pump 22 is driven by engine 14; thus, when engine 14 is not rotating, mechanical oil pump 22 is not pumping oil. Engine 14 is also coupled to planetary gears 28 of transmission 30. Transmission 30 includes planetary gears 28 as well as sun gear 32 and ring gear 34. A generator motor 18 is coupled to sun gear 32 by shaft 38. Traction motor 16 is coupled by a shaft 40 and gear 42 to ring gear 34 of transmission 30. Traction motor 16 is coupled to wheels 12 of vehicle via a reduction gear set 44 and 46 and a differential 48.

The HEV embodiment shown in FIG. 1 represents one non-limiting arrangement. Alternatively, the components of FIG. 1 are arranged differently and/or the system is comprised of different components.

The components enclosed within the dotted line of FIG. 1 are housed within the transaxle 19, according to one embodiment. Alternatively, the components shown residing within transaxle 19 may be contained in more than one housing.

Figure 2:
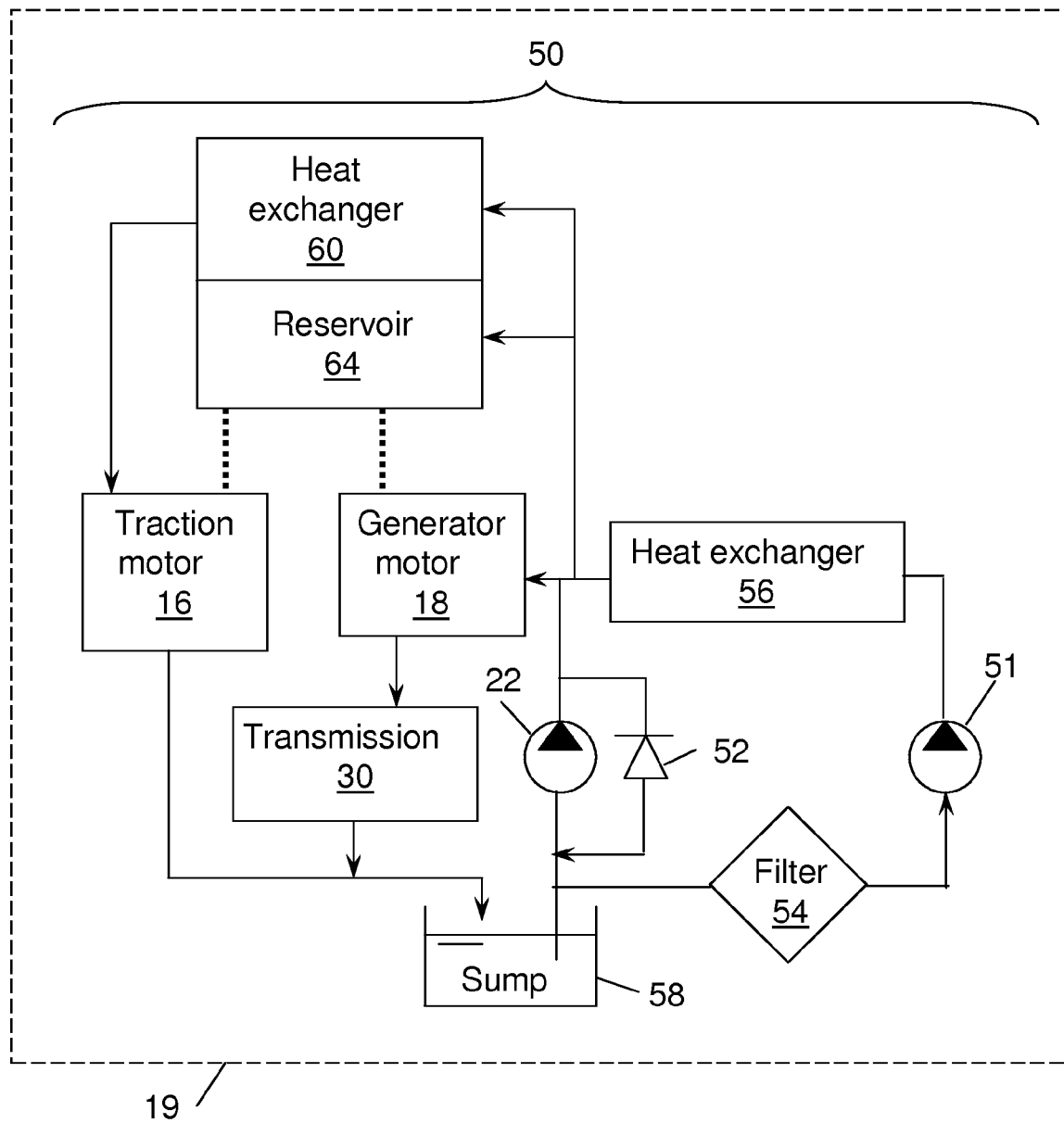
FIG. 2 is a schematic representation of an exemplary configuration of a fluid circuit for lubricating and cooling components in a hybrid electric vehicle.

Referring to FIG. 2, a schematic of the lubricant flow system within transaxle 19 is shown. Both the mechanical pump 22 and an electric pump 51 pump lubricant through fluid circuit 50. Pumps 22 and 51 are arranged in parallel. Mechanical pump 22 has a pressure relief valve 52 to ensure that a maximum system design pressure is not exceeded in fluid circuit 50. In the branch of fluid circuit 50 having electric pump 51, there is also a filter 54 and a heat exchanger 56. In alternative embodiments, filter 54 and heat exchanger 56 are placed in other parts of fluid circuit 50. Lubricant is provided to generator motor 18 and to transmission 30 before being returned to sump 58. Parallel to the flow passing through motor 18 and transmission 30 is another branch to heat exchanger 60 and traction motor 16, which also returns flow to sump 58. For schematic purposes, sump 58 is shown as a particular container within transaxle 19. However, sump 58 may comprise the lower portion of transaxle 19, forming an oil pan of sorts. An oil pickup 62 extending into sump 58 supplies oil to the inlet of pumps 22 and 51.

In FIG. 2, lubricant is shown being provided under pressure to generator motor 18, heat exchanger 60, traction motor 16, and transmission 30. Alternatively and/or additionally, an oil reservoir 64 is provided near the top of transaxle 19. Reservoir 64 provides drip lubrication to traction motor 16 and generator motor 18. Within transaxle 19, rotating components splash lubricant within the casing of transaxle 19 providing yet another way that lubricant is transported within transaxle 19. The fluid circuit shown in FIG. 2 is one example of many alternative configurations to provide drip lubrication, pressurized lubrication, spray lubrication, and any combination thereof to the various components within transaxle 19. Furthermore, the components in FIG. 2 may be arranged in a different order in the fluid circuit in an alternative embodiment.

There are four modes of operation:

| Mode | Mechanical pump 22 | Electric pump 51 | Operating condition |
| --- | --- | --- | --- |
| 1 | On | On | Engine 14 on; flow from mechanical pump 22 insufficient; supplement with electric pump 51 |
| 2 | On | Off | Engine 14 on; sufficient flow provided by mechanical pump 22 |
| 3 | Off | On | Engine 14 off; use electric pump 51 to cool and/or lubricate system components |
| 4 | Off | Off | Engine 14 off; duration of pure electric operation is short; residual oil from prior operation is sufficient to cool and lubricate |

In a HEV, whether the internal combustion engine 14 is operating is based on many factors: state of charge of vehicle batteries, driver demand, operating condition, and ambient conditions to name a few. Turning on engine 14 simply for driving mechanical oil pump 22 can constrain HEV operation and negatively impact overall fuel efficiency of the operation, which is one of the disadvantages of the prior art overcome by an embodiment of the present disclosure in which electric pump 51 is provided in parallel with mechanical pump 22.

The terms oil and lubricant have been used interchangeably to describe the fluid within transaxle 19. In one embodiment the fluid is a transmission fluid. Alternatively, the fluid is any fluid that can lubricate the gears, motor bearings, and shaft bearings as well as carry energy to the heat exchanger to keep the components housed within transaxle 19 sufficiently cool and lubricated. In particular, traction motor 16 and generator motor 18 have two such demands: lubrication of their bearings and cooling of motor windings. Lubricant is also provided to transmission 30 to lubricate both gears and bearings. At a particular vehicle operating condition, cooling of traction motor 16 might be more demanding than any other component in transaxle 19. At another operating condition, providing lubricant flow to transmission 30 may be most demanding. At even another operating condition, providing lubrication to traction motor 16 bearings may be most demanding. According to an aspect of the present disclosure, the amount of lubricant provided is dictated by the most demanding component at any given operating condition.

Figure 3:
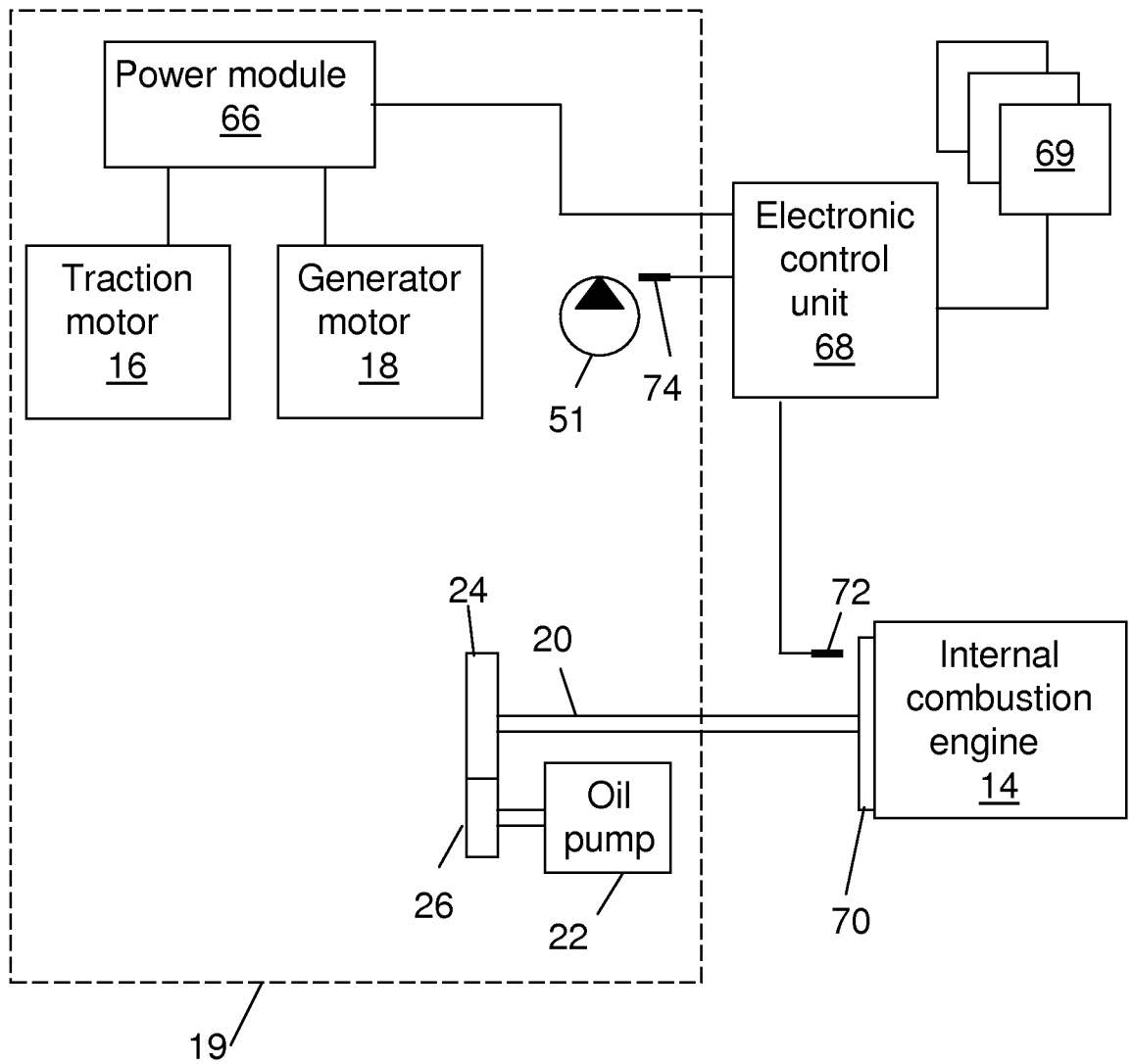
FIG. 3 is a schematic representation of sensors and actuators coupled to a control unit as part of a hybrid electric vehicle.

A schematic representation of electrical connections for a HEV relevant to the present discussion is shown in FIG. 3. Power module 66 provides a driving current to electric pump 51. The control for the driving current is commanded to power module 66 from an electronic control unit (ECU) 68. Generator motor 18 and traction motor 16 may be provided current from or provide current to power module 66 depending on the operating mode of the HEV system. Power module 66 is coupled to a battery pack (not shown) as an electrical energy source/sink. Electric pump 51 includes a pump driven by an electric motor. In one embodiment, the electric motor is an AC motor, in which case the speed of the motor, and thus the pump, can be inferred, as will be discussed in more detail below. In another embodiment, the electric motor is a DC motor. In such a situation, the electric pump speed can be measured by a speed sensor 74 with the signal from speed sensor 74 provided to ECU 68. Speed sensor may be a Hall effect sensor proximate a toothed wheel rotating with electric pump 51 or any other speed sensor known to one skilled in the art.

According to an embodiment of the present disclosure, operating parameters associated with electric pump 51 can be used to infer flow rate and pressure in the fluid circuit. Such inferred values can be determined whether mechanical pump 22 is operated or not. When both electric pump 51 and mechanical pump 22 are operated, the flow rate provided by mechanical pump 22 is estimated. Because mechanical pump 22 is a positive displacement pump, its estimated output flow rate is based on its rotational speed. Mechanical pump 22 is driven by and coupled to engine 14 via a gear set 24 and 26. Typically, engine 14 is provided with a toothed wheel 70 and a Hall effect sensor 72. Sensor 72 provides a signal to ECU 68, from which engine speed is computed and mechanical pump speed can be computed based on engine speed and a gear ratio of gears 24 and 26.

Figure 4:
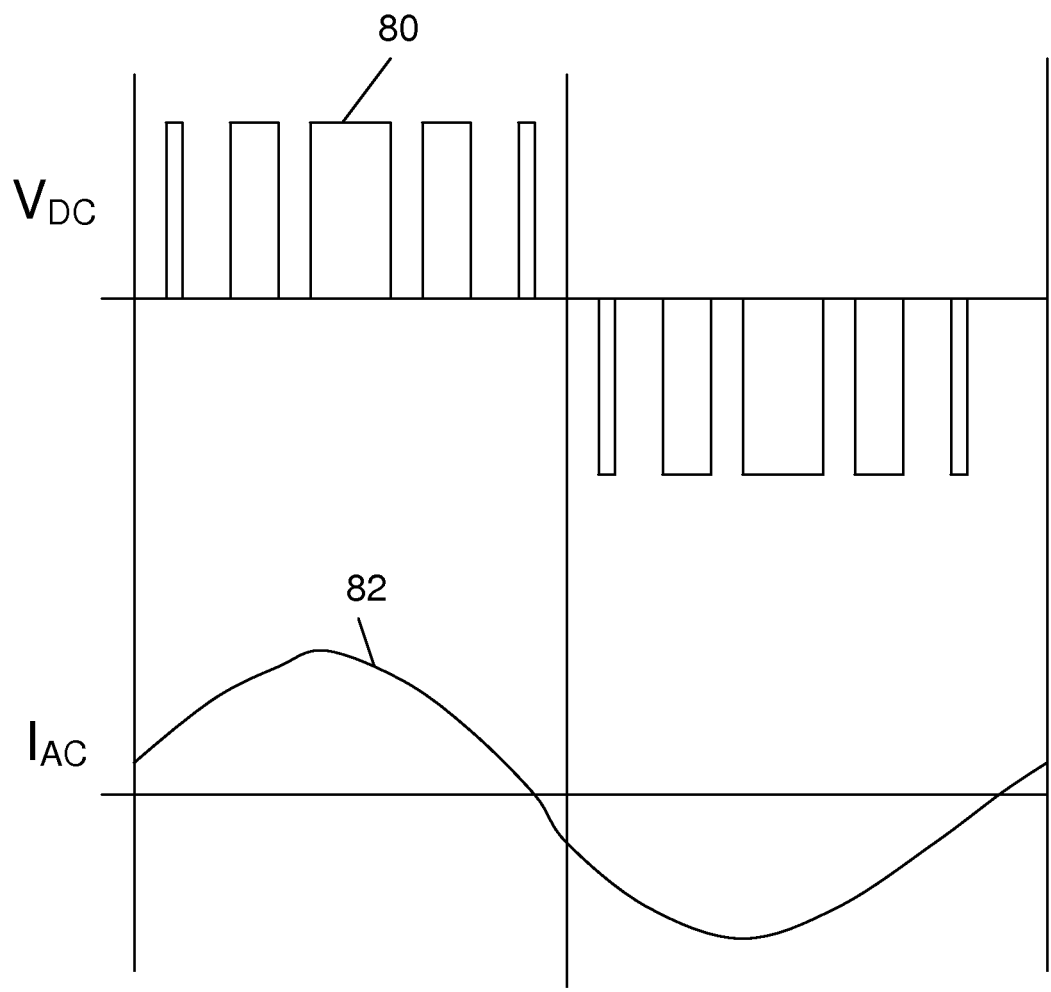
FIG. 4 shows an example pulse width train to drive an AC motor and the resulting magnetic flux that the pulse width train induces.

Electric pump 51, in one embodiment, is driven by an AC motor. The pump is controlled by applying a pulse width modulated signal, such as 80 shown in FIG. 4. The frequency, reciprocal of period, and width of the pulse train 80 applied to windings of an AC motor induces a magnetic flux due to a resulting current flow 82, thereby causing the AC motor to rotate. The rotational speed of the AC motor is based on the timing and pattern of the applied pulses. The pulses applied to the windings are of longer duration and resulting AC current is higher when a load on the AC motor is high. In such a manner, the torque of the motor can be inferred, or estimated, based on the resulting AC current.

Figure 5:
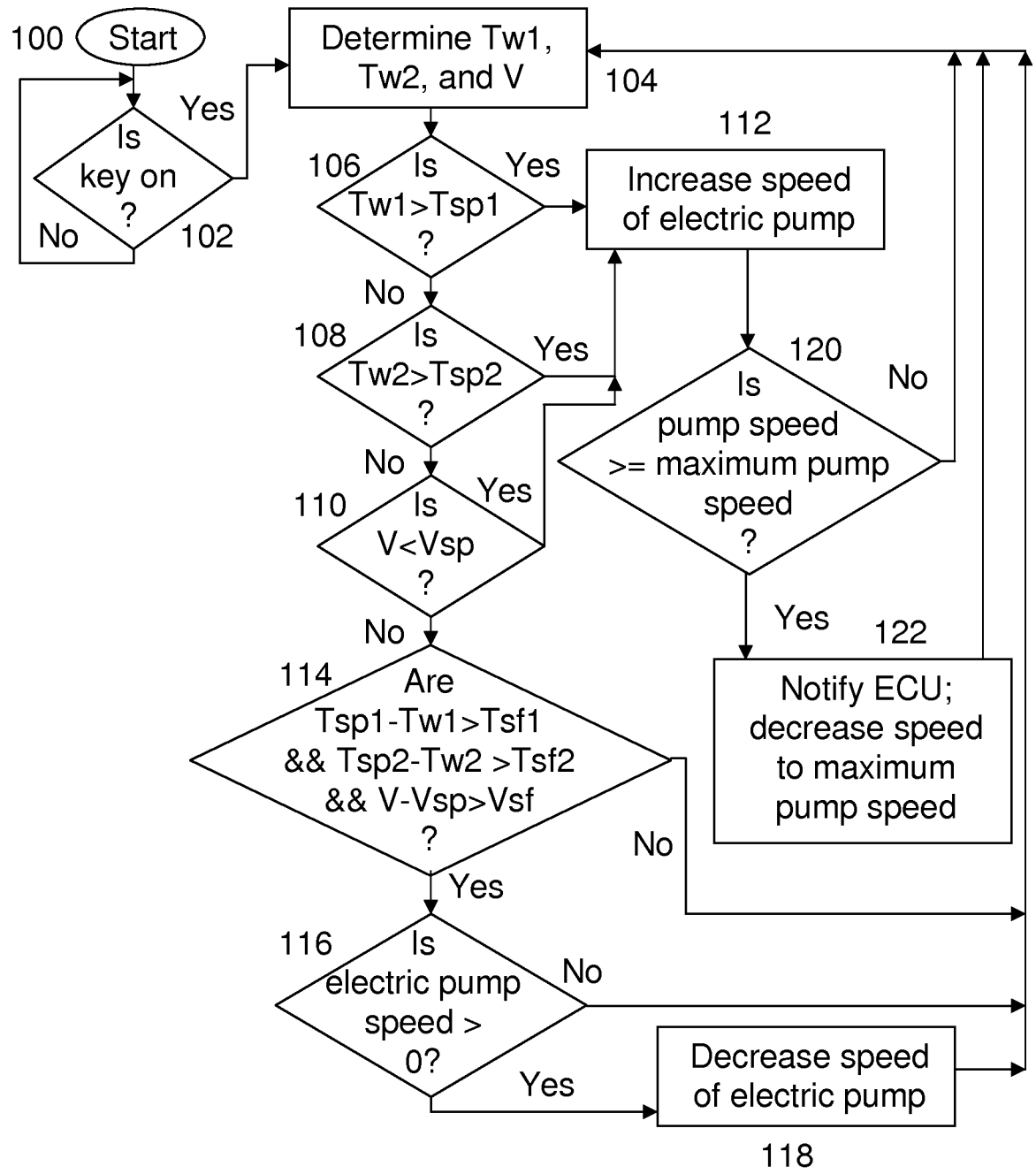
FIGS. 5 and 6 represent flow charts of methods according to embodiments of the present disclosure.

A flowchart showing an embodiment of the present disclosure to determine the component having the most demanding lubrication requirement is shown in FIG. 5. The algorithm starts in 100 and passes control to block 102 to determine whether the key is on. If not, control passes to block 102 until a positive result is encountered. Upon a positive result in 102, control passes to block 104 in which a temperature of the windings in a first electric motor, Tw1, a temperature of the windings in a second electric motor, Tw2, and a powertrain component volumetric flow rate, V, are determined. These three quantities are provided by way of example and not intended to be limiting. For example, in another embodiment, a determination of sufficient lubrication can be based on pressure in place of flow rate. In yet another alternative, the flowchart in FIG. 5 can be contracted or expanded to include fewer or more decision blocks, examples include: three desired pressures (as demanded by a generator motor, a traction motor, and a transmission); two desired maximum temperatures (traction motor and generator motor) and one minimum flow rate (through transmission) and one maximum temperature (traction motor).

Motor winding temperature set points, Tsp1 and Tsp2, may be based on total transaxle 19 losses, preferred motor winding operating temperatures or other criteria. The volumetric flow rate set point, Vsp, may be based on transaxle 19 losses, wear tables, or other criteria. In blocks 106, 108, and 110, it is determined whether Tw1 is greater than a first set point temperature, Tsp1, whether Tw2 is greater than a second temperature set point, Tsp2, and whether the volumetric flow rate, V, is less than a volumetric flow rate set point, Vsp, respectively. If any one of these conditions returns a positive result indicating insufficient lubricant flow, control is passed to block 112 in which the frequency of the AC current is increased to increase the pump rotational speed. In another alternative, the pump is driven by a DC motor and pulse width to the motor is increased to increase motor rotational speed. Or, in another alternative, the speed of electric pump 51 is increased in block 112 according to any other known manner, such as having multiple, selectable windings in electric pump 51, which can be switched in and out to affect pump capacity. If negative results are returned in all of blocks 106, 108, and 110, control passes to block 114 in which it is determined whether temperatures, Tw1 and Tw2, are lower than their respective set point temperatures, Tsp1 and Tsp2, by more than suitable safety factors, Tsf1 and Tsf2, respectively. It is also determined whether the volumetric flow rate exceeds the volumetric flow set point by a suitable safety factor, Vsf. The expressions in block 114 are evaluated using a Boolean "and" operation. Thus, control passes to block 116 only if all the expressions are true; otherwise, control passes to block 104. A positive result from block 114 passes control to block 116 in which it is determined whether electric pump 51 is on. If it is not, no further decrease is possible and control passes to block 104. If the electric pump is on, control passes to block 118 in which speed of electric pump 51 is decreased with control returning to block 104. Depending on the type of electric motor coupled to the pump, the speed is decreased by decreasing the AC frequency, the pulse width, etc.

Continuing to refer to FIG. 5, when speed of electric pump 51 is increased in 112, control passes to 120 in which is determined whether the pump speed is greater than or equal to the maximum pump speed. If not, control passes to 104. If so, control passes to 122 to notify the ECU of the over speed condition. Also in 122, electric pump speed is set to the maximum speed before returning to block 104.

In other embodiments, a time rate of change quantity is also compared to a threshold to determine whether additional fluid supply is desired. For example, an electric motor that is converting electrical energy into mechanical energy or vice versa can heat up very quickly. Thus, a desired cooling level can be based on both the temperature of the windings as well as a rate of change of the temperature of the windings. Additional refinements, such as use of a PID controller, are obvious to one skilled in the art.

In FIG. 5, safety factors, Tsf1, Tsf2, and Vsf, are employed. In alternative embodiments, the safety factors are set to zero. Also in FIG. 5, first and second temperature maxima, Tmax1 and Tmax 2, are shown. In one embodiment, the same maximum temperature is used to detect overheating in both electric motors with Tmax1 equal to Tmax2.

It is desirable to maintain the temperature in generator motor 18 and traction motor 16 below a temperature at which damage can result or maximum operating temperature. The temperature in the motor can be estimated based on a model of energy generation within the motor as well as the energy rejection to the lubricant based on flow to and heat transfer characteristics of the motor. Alternatively, motor temperature can be estimated based on a signal from a sensor in or near the motor. In yet another alternative, the temperature is estimated from a measure of resistance of the windings:

$$R = Rref[1 + \alpha((T - Tref)]$$

where Rref is the resistance at reference temperature, Tref, and $\alpha$ is the change in resistance per degree temperature change, a material property. Solving for T:

$$T = Tref + (1/\alpha)(R/Rref - 1).$$

As discussed in regards to FIG. 5, control is based on estimating temperature of the motor windings. Alternatively, control could be based on maintaining the resistance in the windings below a threshold. In yet another alternative, a flow rate can be determined which provides the desired cooling. Control can be based on providing that flow rate.

Figure 6:
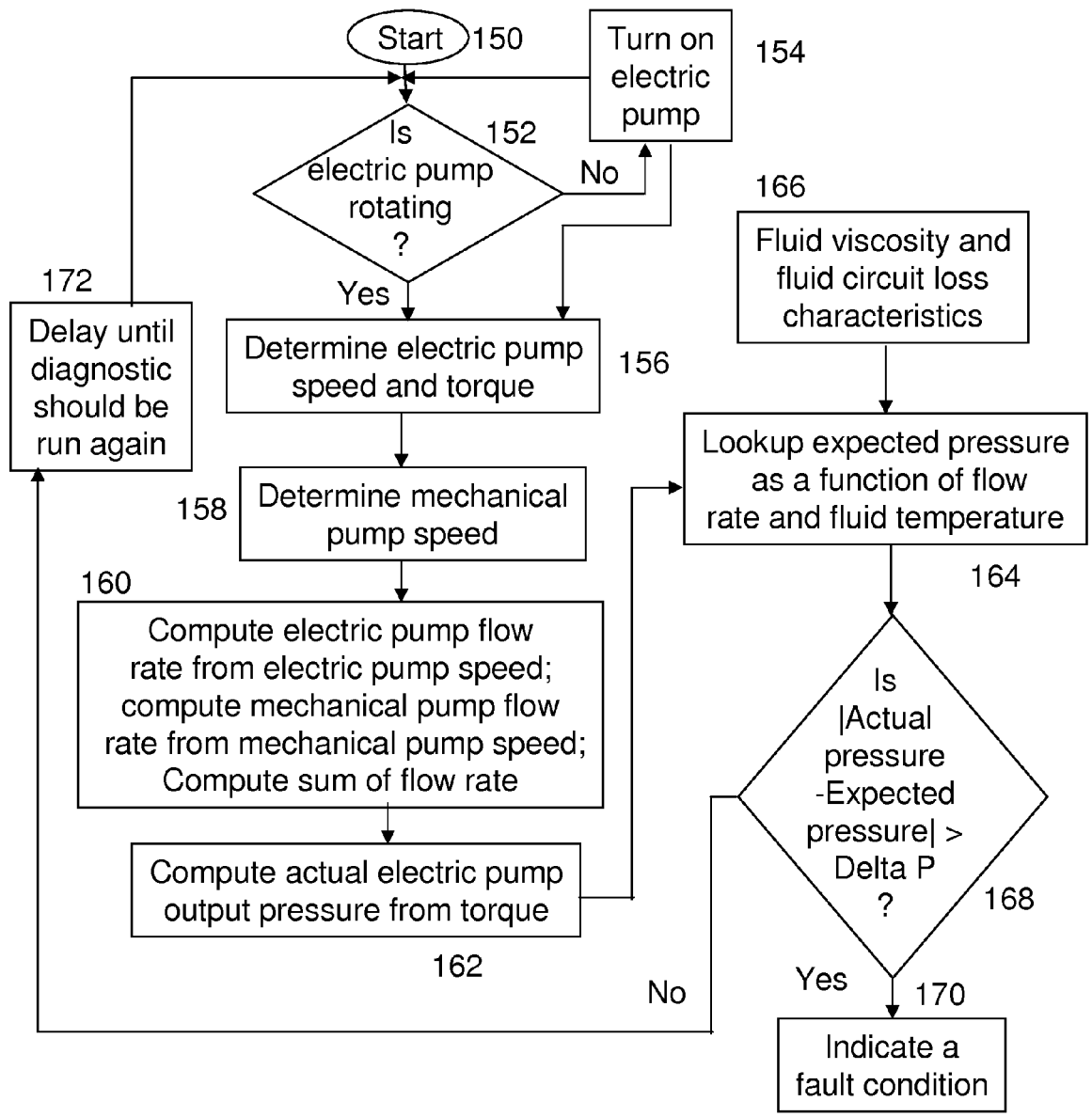

Referring to FIG. 6, a diagnostic routine starts in block 150. In 152, it is determined whether electric pump 51 is operating. If it is not, pump 51 is turned on in 154 prior to proceeding to 156 in which the speed and torque of electric pump 51 are determined. In 158 the speed of mechanical pump 22 is determined. Blocks 156 and 158 can be performed in any order. Control passes to block 160, in which the total flow rate is determined. Control passes to block 162 in which actual electric pump output pressure is determine based on torque. Control then passes to block 164 in which expected pressure is determined based on flow rate and fluid temperature. Block 164 can be a lookup table or computation based on, e.g., a polynomial equation. Block 166 provides input information for the computation or table lookup in block 164, providing at least the fluid viscosity as a function of temperature and the loss characteristics of the fluid circuit. Control passes to decision 168 to determine whether the absolute value of the difference in the actual and expected pressures exceeds a predetermined pressure difference. A positive result in decision 168 indicates that a fault is detected and control passes to block 170 in which the fault is indicated by setting a fault code or a light indicating a fault to the operator of the vehicle. Alternatively, specific high and low limits may be set based upon typical failure modes. Otherwise, control passes to block 172. Rather than run a diagnostic test continuously, in one embodiment, block 172 inserts a delay. In an alternative embodiment, the diagnostic is executed only when electric pump 51 is operating, i.e., the pump isn't turned on simply for diagnostic purposes.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

What is claimed:

1. A method to determine a fault in a fluid circuit, the fluid circuit fluidly coupled to at least an electric motor and a transmission, the method comprising:
    operating an electric pump when a mechanical pump provides insufficient flow while the mechanical pump and the engine are on;
    determining an actual pressure when the electric pump disposed in the fluid circuit is operating;

determining an expected pressure; and detecting the fault when a difference between actual pressure and expected pressure exceeds a predetermined pressure difference.

2. The method of claim 1 wherein the actual pressure is based on a speed of the electric pump.

3. The method of claim 2 wherein the electric pump comprises an AC motor and the speed of the electric pump is based on an AC drive frequency supplied to the electric pump.

4. The method of claim 2 wherein the electric pump comprises a DC motor and the speed of the electric pump is determined from a signal from a speed sensor proximate the electric pump.

5. The method of claim 1 wherein the expected pressure is based on at least a temperature of fluid in the fluid circuit and a flow rate through the electric pump.

6. The method of claim 5 wherein the flow rate is based on speed of the electric pump and the speed is based on an AC drive frequency supplied to the electric pump.

7. The method of claim 5 wherein:

the fluid circuit is also fluidly coupled to a mechanical pump;

the mechanical pump is arranged in parallel with the electric pump; and the flow rate is further based on a speed of the mechanical pump.

8. The method of claim 1, further comprising: turning on the electric pump to conduct a fault determination.

9. The method of claim 8 wherein:

the fluid circuit is also fluidly coupled to a mechanical pump; and the mechanical pump is arranged in parallel with the electric pump.

10. The method of claim 9 wherein the flow rate is further based on a speed of the mechanical pump.

11. The method of claim 1, further comprising:

operating an electric pump in response to a motor temperature exceeding a predetermined value.

12. A method to determine a fault in a fluid circuit coupled to an electric motor and a transmission, comprising:

increasing speed of an electric pump in response to fluid circuit flow being below a corresponding threshold; and generating a fault signal in response to a difference between actual pressure in the fluid circuit when the electric pump is operating and expected pressure associated with the pump speed and torque exceeds a predetermined pressure difference.

13. The method of claim 12 further comprising determining the expected pressure as a function of flow rate and fluid temperature.

14. The method of claim 13 further comprising determining the expected pressure based on fluid viscosity and fluid circuit loss characteristics.

15. The method of claim 12 further comprising operating a mechanical pump in parallel with the electric pump.

* * * * *